United States Patent
Lin et al.

(10) Patent No.: US 6,680,822 B1
(45) Date of Patent: Jan. 20, 2004

(54) BI-STABLE INERTIAL LATCH FOR HARD DISK DRIVES

(75) Inventors: Arthur Lin, Fremont, CA (US); Robert Reinhart, San Jose, CA (US); Rodney Ngai, Sunnyvale, CA (US)

(73) Assignee: Maxtor Corporation, Longmont, CO (US)

( * ) Notice: Subject to any disclaimer, the term of this patent is extended or adjusted under 35 U.S.C. 154(b) by 245 days.

(21) Appl. No.: 10/039,871

(22) Filed: Jan. 3, 2002

(51) Int. Cl.[7] .................................................. G11B 5/54
(52) U.S. Cl. ..................................................... 360/256.4
(58) Field of Search ............................ 360/256.2, 256.4

(56) References Cited

U.S. PATENT DOCUMENTS

| | | |
|---|---|---|
| 5,124,867 A | 6/1992 | Kitahori et al. |
| 5,189,576 A | 2/1993 | Morehouse et al. |
| 5,296,986 A | 3/1994 | Morehouse et al. |
| 5,313,354 A | 5/1994 | Sampietro et al. |
| 5,319,511 A | 6/1994 | Lin |
| 5,377,065 A | 12/1994 | Morehouse et al. |
| 5,404,257 A | 4/1995 | Alt |
| 5,477,403 A | 12/1995 | Strickler |
| 5,543,986 A | 8/1996 | Albrecht |
| 5,555,146 A | 9/1996 | Hickox et al. |
| 5,602,700 A | 2/1997 | Viskochil et al. |
| 5,668,683 A | 9/1997 | Stone |
| 5,717,544 A | 2/1998 | Michael |
| 5,717,548 A | 2/1998 | Koester et al. |
| 5,768,057 A | 6/1998 | Fernandes et al. |
| 5,982,587 A | 11/1999 | Alagheband et al. |
| 6,163,440 A | 12/2000 | Takahashi et al. |
| 6,185,074 B1 | 2/2001 | Wang et al. |
| 6,469,871 B1 * | 10/2002 | Wang ...................... 360/256.4 |

* cited by examiner

*Primary Examiner*—A. J. Heinz
(74) *Attorney, Agent, or Firm*—James P. Broder; Steven G. Roeder

(57) ABSTRACT

A disk drive includes a stop, a head stack assembly and a latch having a latch arm that is movable between a closed position and an open position. The latch includes a first retainer that urges the latch arm toward the open position, and a second retainer that urges the latch arm toward the closed position. The latch includes a mover that contacts the latch arm upon a sufficient shock to the disk drive and causes the latch arm to move to the closed position. The disk drive includes an actuator motor that momentarily urges the head stack assembly against the latch during startup of the disk drive, thereby moving the latch arm to the open position.

53 Claims, 7 Drawing Sheets

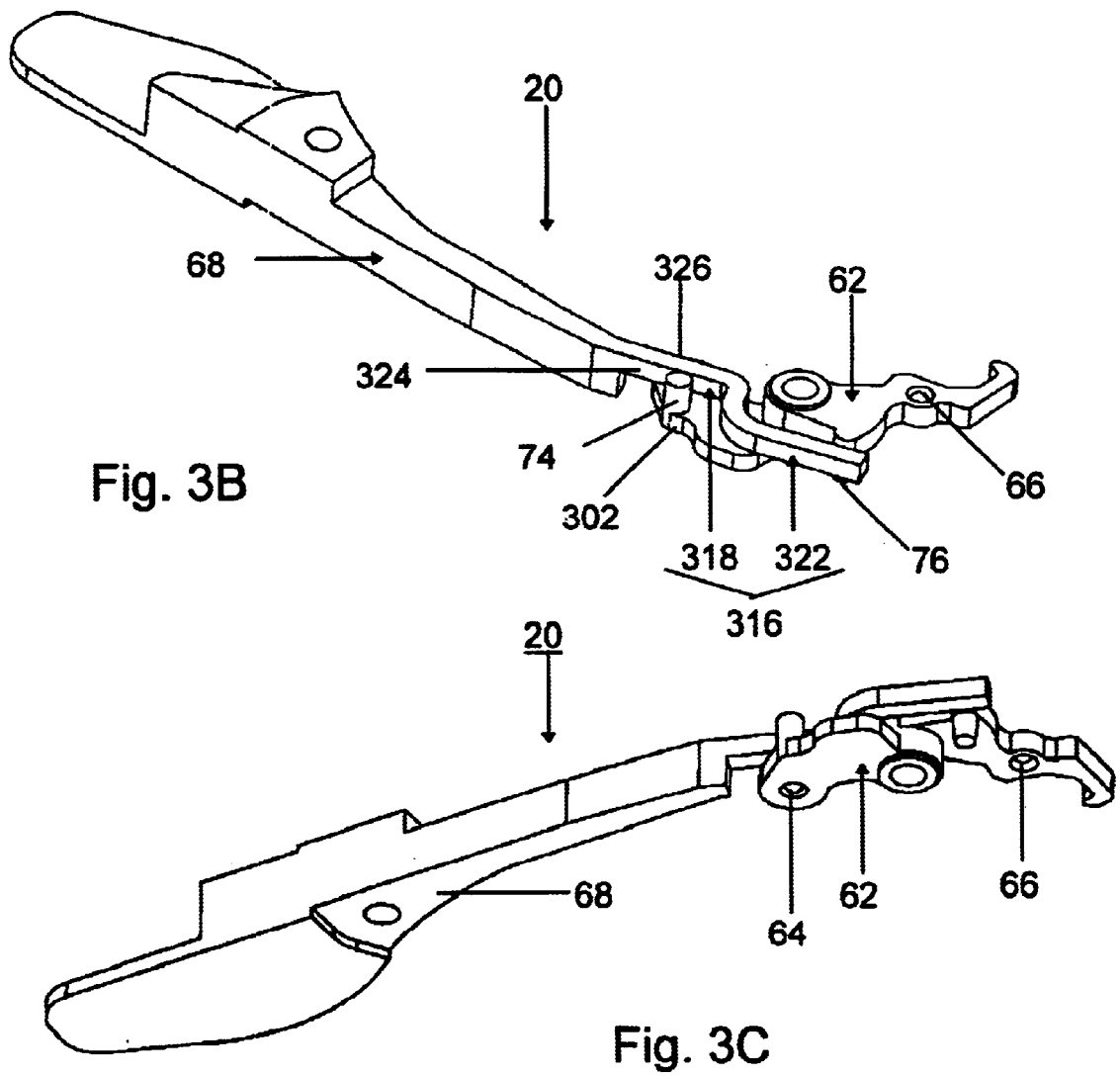

BI-STABLE INERTIAL LATCH FOR HARD DISK DRIVES

FIELD OF THE INVENTION

The present invention relates generally to disk drives and to a latch that inhibits the movement of a head stack assembly of a disk drive following a shock to the disk drive.

BACKGROUND

Disk drives are widely used in computers and data processing systems for storing information in digital form. Conventional disk drives include a head stack assembly, one or more storage disks and a spindle motor that rotates the storage disks. The head stack assembly includes an actuator motor, one or more actuator arms, and one or more head suspension assemblies. The actuator motor moves the actuator arms and the head suspension assemblies relative to the storage disks.

Each head suspension assembly includes a read/write head and a slider that "flies" upon an air bearing in very close proximity to the rotating storage disk. Unfortunately, contact between the slider and the storage disk can result in damage to the storage disk or the head suspension assembly.

In some disk drives, the actuator motor positions the slider over a landing zone as power is removed from the spindle motor. The landing zone can be a ramp that is positioned near the storage disk. Alternately, the landing zone can be a textured, non-data region of the storage disk.

However, even when the slider is positioned safely in the landing zone, a sufficient force or shock to the disk drive can cause the slider to move from the landing zone onto a data storage surface of the storage disk. Conventional disk drives attempt to address this problem with a latch that inhibits movement of the head stack assembly, and thus the slider, relative to the storage disk during non-rotation of the storage disk. Unfortunately, existing latch designs are not altogether satisfactory.

For example, a wind vane latch is commonly used in disk drives. Normally, the wind vane latch is biased to a closed position that inhibits movement of the head stack assembly. The wind vane latch relies upon airflow generated by rotation of the storage disks to move the wind vane latch from the closed position to an open position that allows for movement of the head stack assembly. However, wind vane latches have not been used in relatively small drives such as notebook drives or microdrives due to the limited airflow generated by the relatively small rotating storage disks.

Other types of normally closed latches require a significant amount of energy to move and/or maintain the latch in the open position. Moreover, the use of normally closed latches can be problematic with ramp type disk drives that require that the slider be loaded onto the storage disk within a tightly specified velocity window. More specifically, the normally closed latch may still be in the closed position and inhibiting motion of the head stack assembly when the storage disk is being accelerated through the desired speed range for loading the slider. Accordingly, normally open latches are generally preferred for disk drives having ramps. With a normally open latch, upon a sufficient shock to the disk drive, the latch temporarily closes to inhibit movement of the head stack assembly for a somewhat arbitrary, brief time period. Subsequently, the latch returns to the open position. However, the temporary closure of the latch may be insufficient after a shock, to inhibit movement of the head stack assembly caused by post shock out-of-phase bouncing of the head stack assembly and the latch. This is especially true for mobile products, which are subjected to more severe and complex shock pulses.

Bi-stable latches have also been developed. In the absence of any external force or disturbance, a bi-stable latch has two different preferential resting positions, namely the open position and the closed position. Conventional bi-stable latches can include a separate motor to move the latch between the positions. Unfortunately, the use of another motor increases the power demand of the disk drive, generates unwanted heat, increases complexity and requires extra electrical connections.

In light of the above, the need exists for a reliable, simple, and efficient latch that effectively inhibits damage to the head suspension assemblies and the storage disks. Another need exists to provide a disk drive including a latch that inhibits movement of the head stack assembly during non-rotation of the storage disks. Still another need exists to provide a latch for a disk drive that is relatively easy and cost effective to manufacture, assemble and use.

SUMMARY

The present invention is directed to a disk drive that includes a storage disk, a stop, a head stack assembly and a latch. The latch includes a latch arm that is movable between a closed position that inhibits movement of the head stack assembly in a direction away from the stop, and an open position that allows for movement of the head stack assembly away from the stop. The latch also includes a first retainer and a spaced apart second retainer that are secured to the latch arm. The first retainer selectively retains the latch arm in the open position, and the second retainer selectively retains the latch arm in the closed position. The bi-stable latch provides protection against out-of-phase bouncing of the head stack assembly and the latch.

The head stack assembly includes an actuator motor that moves the head stack assembly relative to the storage disk. In one embodiment, the first retainer interacts with the actuator motor to urge the latch arm to the open position and the second retainer interacts with the actuator motor to urge the latch arm to the closed position. Thus, both retainers interact with a magnet component that is already present in the drive.

The latch can also include a mover that contacts the latch arm upon a sufficient shock to the disk drive. The mover causes the latch arm to move from the open position to the closed position. Additionally, the latch arm can include a first mover contact and spaced apart, second mover contact. The mover engages the first mover contact upon a sufficient force or shock in a first direction to the disk drive, and moves the latch arm to the closed position. Further, the mover engages the second mover contact upon a sufficient force or shock in a second direction to the disk drive, and moves the latch arm to the closed position. With this design, the same mover moves the latch to the closed position if the shock is in the first direction or if the shock is in the second direction.

In one embodiment, when the latch is in the closed position, movement of the head stack assembly toward the stop causes the head stack assembly to engage the latch arm and move the latch arm from the closed position to the open position. With this design, a separate motor is not necessary to move the latch arm from the closed position to the open position.

The present invention is also directed to a method for selectively retaining a head stack assembly near a stop of a disk drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 3B is a top perspective view of the latch illustrated in FIG. 1;

FIG. 3C is a bottom perspective view of the latch illustrated in FIG. 1;

DESCRIPTION

Figure 1:
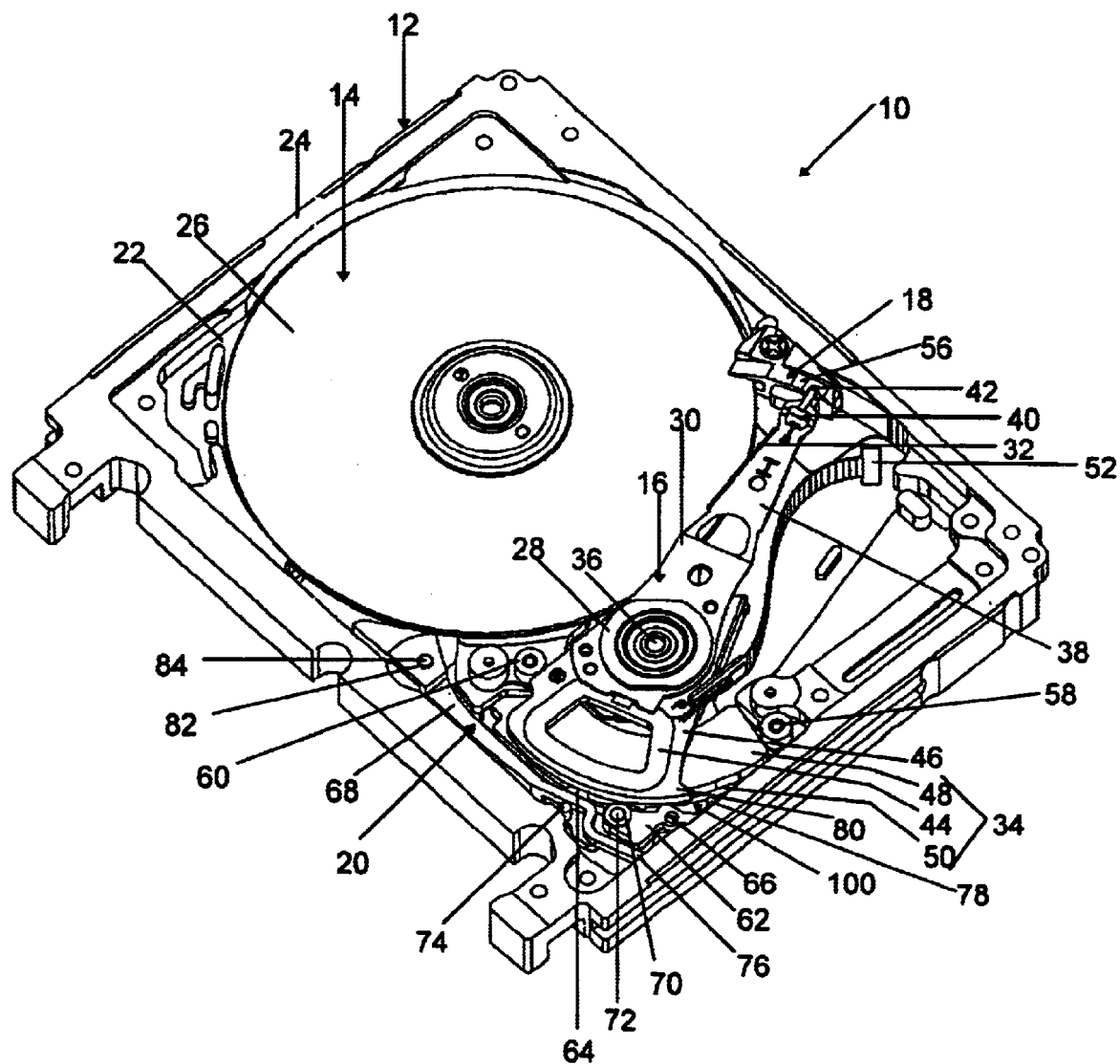
FIG. 1 is a top perspective view of a disk drive including a latch having features of the present invention.

Referring initially to FIG. 1, a disk drive 10 according to the present invention includes (i) a drive housing 12, (ii) one or more rotating, magnetic storage disks 14, (iii) a head stack assembly 16, (iv) a landing zone 18, and (v) a latch 20 that selectively retains the head stack assembly 16 in the event of a sufficient shock to the disk drive 10.

The drive housing 12 retains the various components of the disk drive 10. The drive housing 12, illustrated in FIG. 1, includes a base 22 and four side walls 24. A typical drive housing 12 also includes a cover (not shown for clarity), which is spaced apart from the base 22 by the side walls 24.

Each storage disk 14 can include a data storage surface 26 on each side or only on one side. FIG. 1 illustrates a single storage disk 14. However, any number of disks 14 can be utilized. The diameter of the storage disk 14 can vary. For example, because the latch 20 does not rely upon airflow generated by rotation of the storage disk 14 to operate, the latch 20 can be used with any size disk drive 10, including smaller disk drives 10 having storage disks 14 with an outer diameter of approximately two and a half inches, one inch, or less.

The head stack assembly 16 illustrated in FIG. 1 includes (i) an actuator hub 28, (ii) an actuator arm 30, (iii) a head suspension assembly 32, and (iv) an actuator motor 34. The actuator hub 28 is rotatably mounted with a bearing assembly (not shown) and an actuator shaft 36 to the drive housing 12. The actuator arm 30 cantilevers from the actuator hub 28, and supports the head suspension assembly 32. The head suspension assembly 32 includes a suspension 38, a slider 40 and one or more read/write heads (not shown). The head suspension assembly 32 can include a lifting feature 42 that engages the landing zone 18. The lifting feature 42 inhibits contact between the head suspension assembly 32 and the landing zone from causing damage to the head suspension assembly 32.

The actuator motor 34 positions the slider 40 and the read/write head relative to the storage disks 14. The actuator motor 34 includes a coil 44 secured with a conductor housing 46 to the actuator hub 28, a magnet component having a pair of spaced-apart magnets 48 (only one magnet 48 is illustrated in FIG. 1 for clarity), and a pair of spaced-apart flux return plates 50 (only one flux return plate 50 is shown in FIG. 1 for clarity). The coil 44 is positioned between the magnets 48 and the magnets 48 are positioned between the flux return plates 50. As explained below, the latch 20 interacts with the magnetic fields generated by the magnets 48 of the actuator motor 34.

A controller 52 (illustrated as a box in FIG. 1) directs current to the coil 44. The magnetic fields generated by the magnets 48 are such that current passing through the coil 44 in one direction causes rotation of the head stack assembly 16 in one radial direction relative to the storage disk 14 (such as the radially outward direction) while reverse current causes reverse direction movement (such as the radially inward direction).

In one embodiment, the head stack assembly 16 is substantially rotationally balanced relative to the actuator shaft 36. Stated another way, the mass times the distance of the center of gravity from the actuator shaft 36 of the components on one side of the actuator shaft 36 is substantially equal to the mass times the distance of the center of gravity from the actuator shaft 36 of the components on the other side of the actuator shaft 36. As a result thereof, a purely lateral force on the drive housing 12 will not result in rotation of the head stack assembly 16.

Additionally, the head stack assembly 16 can include an actuator catch 54 that is engaged by the latch 20. For example, the actuator catch 54 can be a wedge shaped projection that cantilevers away from the conductor housing 46.

The landing zone 18 provides a safe landing area for the slider 40 during non-rotation of the storage disk 14. During shut-down of the disk drive 10, the actuator motor 34 moves the slider 40 to the landing zone 18. FIG. 1 illustrates the slider 40 in the landing zone 18. This inhibits damage to the head suspension assembly 32 and the storage disk 14 caused by contact between the slider 40 and the storage disk 14. As illustrated in FIG. 1, the landing zone 18 can have a ramp 56 that is positioned near the outer diameter of the storage disk 14. Alternately, the ramp 56 could be positioned near the inner diameter of the storage disk 14. Still alternatively, the landing zone 18 can be located on a textured, non-data region (not shown) of the storage disk 14, near the outer diameter or the inner diameter of the storage disk 14.

Additionally, the disk drive 10 can include an inner diameter stop 58 and an outer diameter stop 60 that limit the rotary travel of the head stack assembly 16. The stops 58, 60 can be secured to the drive housing 12. The inner diameter stop 58 engages the head stack assembly 16 and inhibits the head stack assembly 16 from crashing the head suspension assembly 32 into the disk hub. The outer diameter stop 60 engages the head stack assembly 16 and inhibits the head stack assembly 16 from moving the slider 40 radially outward past the landing zone 18. The stops 58, 60 can be formed from a relatively resilient, compressible material so that when the head stack assembly 16 contacts one of the stops 58, 60, some or all of the momentum of the head stack assembly 16 can be absorbed by the stops 58, 60. In addition, as described in greater detail below, the resilient outer diameter stop 60 assists in operation of the latch 20.

The latch 20 illustrated in FIG. 1 inhibits movement of the head stack assembly 16 away from the outer diameter stop 60 upon a sufficient shock to the disk drive 10. Alternately, the latch 20 could be designed to inhibit movement of the head stack assembly 16 away from the inner diameter stop 58. The design of the latch 20, including the individual components of the latch 20, can vary depending upon the requirements of the head stack assembly 16 and the disk drive 10. In the embodiment illustrated in FIG. 1, the latch 20 includes a latch arm 62, a first retainer 64, a second retainer 66, and a mover 68.

The latch arm 62 is movable between an open position 100 (illustrated in FIG. 1) that allows for rotation of the head stack assembly 16 away from the outer diameter stop 60 and a closed position 500 (illustrated in FIGS. 5 and 6) that inhibits movement of the head stack assembly 16 away from the outer diameter stop 60. The latch arm 62 includes an arm hub 70 that is rotatably mounted with a bearing assembly (not shown) and an arm shaft 72 to the drive housing 12. The bearing assembly can be designed to minimize the force need to rotate the latch arm 62. Alternatively, the bearing assembly can be designed to increase the level of force needed to rotate the latch arm 62 to adjust the sensitivity requirements of the latch 20.

The latch arm 62 includes a first mover contact 74, a second mover contact 76, a latch stop 78, and a contact section 80. The first mover contact 74 is positioned substantially between one of the side walls 24 of the drive housing 12 and the mover 68, while the second mover contact 76 is positioned substantially between the mover 68 and the head stack assembly 16. The latch stop 78 engages the actuator catch 54 to inhibit movement of the head stack assembly 16. The conductor housing 46 of the head stack assembly 16 engages the contact section 80 to move the latch arm 62 from the closed position 500 to the open position 100 as described in more detail below. In the design illustrated in FIG. 1, the latch arm 62 engages a first side of the head stack assembly 16 and an opposed second side of the head stack assembly 16 engages the outer diameter stop 60.

The first retainer 64 biases the latch arm 62 towards the open position 100 and the second retainer 66 biases the latch arm 62 towards the closed position 500. When the latch arm 62 is in the open position 100, the first retainer 64 maintains the latch arm 62 in the open position 100 until a sufficient shock to the drive housing 12 causes the mover 68 to move the latch arm 62 to the closed position 500. Thus, unless the drive 10 is sufficiently shocked, the latch arm 62 is in the open position 100 and the head stack assembly 16 is free to load the slider 40 onto the storage disk 14 when the storage disk 14 is rotating within the specified velocity window.

After a sufficient shock, the mover 68 moves the latch arm 62 from the open position 100 to the closed positioned 500. In the closed position 500, the second retainer 66 maintains the latch arm 62 in the closed position 500 until the head stack assembly 16 is used to move the latch arm from the closed position 500 to the open position 100. Because after a shock the second retainer 66 maintains the latch arm 62 in the closed position 500, the latch 20 provides protection against out-of-phase bouncing of the head stack assembly 16 and the latch 20.

In FIG. 1, the first retainer 64 is secured to the latch arm 62 and interacts with and is attracted to the magnetic field produced by the magnets 48 of the actuator motor 34 to urge the latch arm 62 to rotate in the clockwise direction around the arm shaft 72 toward the open position 100. Further, the second retainer 66 is secured to the latch arm 62 and interacts with and is attracted to the magnetic field generated by the magnets 48 of the actuator motor 34 to urge the latch arm 62 to rotate in the counterclockwise direction around the arm shaft 72 toward the closed position 500.

The mover 68 moves the latch arm 62 from the open position 100 to the closed position 500 upon a sufficient shock to the drive housing 12. In FIG. 1, the mover 68 includes a mover hub 82 that is rotatably mounted with a bearing assembly (not shown) and a mover shaft 84 to the drive housing 12. With this design, a sufficient shock to the drive housing 12 causes the mover 68 to rotate and move the latch arm 62. It should be noted that the bearing assembly can be designed to minimize the force need to rotate the mover 68. Alternatively, the bearing assembly can be designed to increase the level of force needed to rotate the mover 68 to adjust the sensitivity requirements of the latch 20.

The shape and material used for the mover 68 can vary depending upon the requirements of the latch 20. In FIG. 1, the mover 68 is located generally parallel to one of the side walls 24 of the drive housing 12 substantially between the side wall 22 and the storage disk 14. However, the mover 68 can alternatively be positioned in any other suitable location within the drive housing 12 that does not interfere with the functioning of the other drive components.

The mover 68 can be formed from a corrosion-resistant metallic material with a relatively high specific gravity such as brass, tungsten or stainless steel, as examples. However, any substantially non-magnetic material can be used for the mover 68. The non-magnetic nature of the material allows the mover 68 to be positioned near the actuator motor 34 without being influenced by the magnetic field of the magnets 48.

The components of the latch 20 can be attached to the drive housing 12 prior to securing the storage disk 14 to the drive housing 12. The components of the latch 20 can be attached drive housing 12 before or after the head stack assembly 16 is secured to the drive housing 12.

Figure 2:
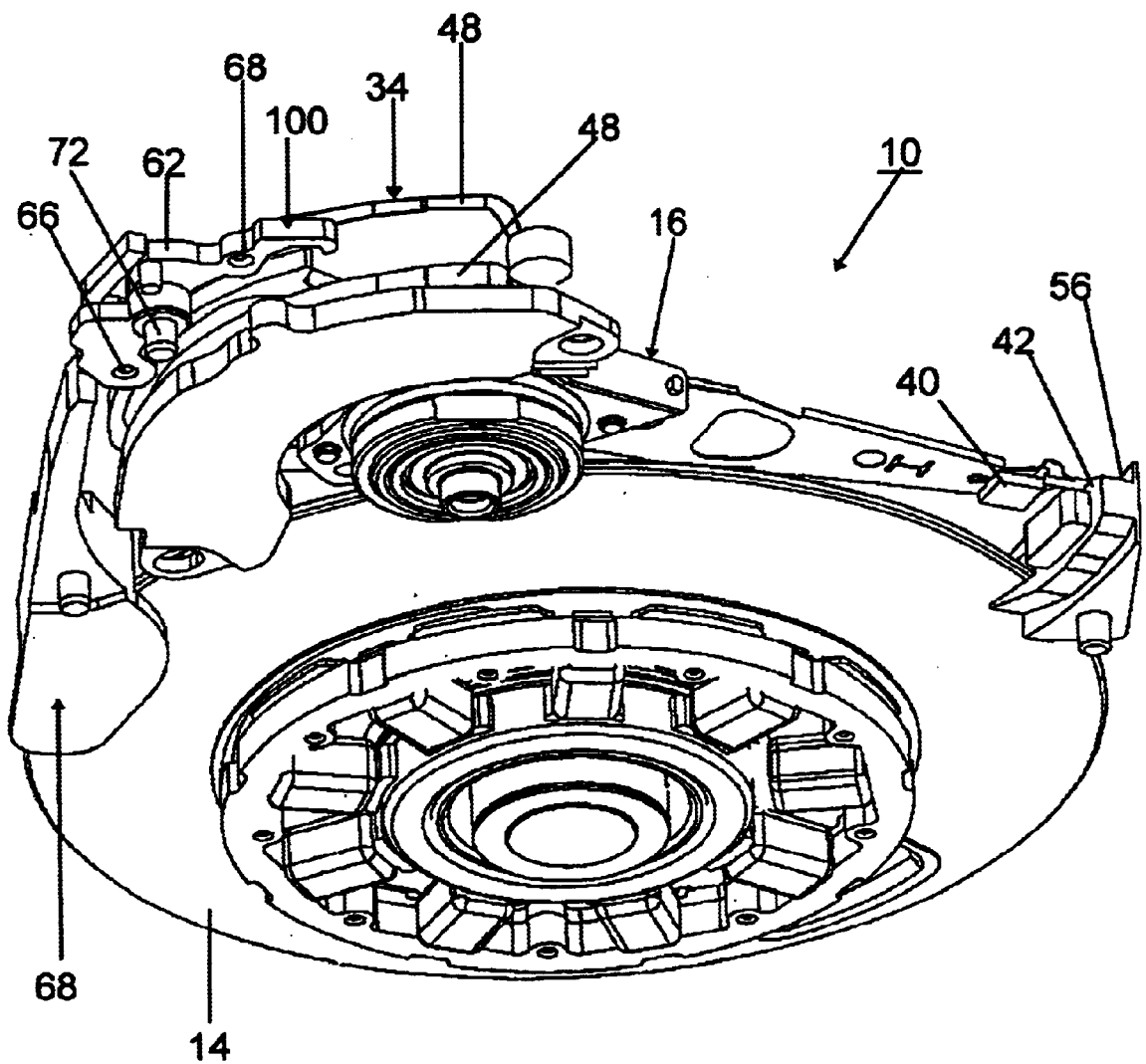
FIG. 2 is a bottom perspective view of a portion of the disk drive illustrated in FIG. 1.

FIG. 2 illustrates a bottom perspective view of a portion of the disk drive 10 with the latch arm 62 in the open position 100 and both magnets 48 of the actuator motor 34. In FIG. 2, the lifting feature 42 is engaging the ramp 56 to maintain the slider 40 in the landing zone 18 away from the storage disk 14. FIG. 2 also illustrates that the latch arm 62 is positioned near the head stack assembly 16 and a portion of the mover 68 is positioned below the storage disk 14.

In this embodiment, the distance between the first retainer 66 and the arm shaft 72 is approximately equal to the distance between the second retainer 68 and the arm shaft 72. Further, in the open position 100, the first retainer 64 is closer than the second retainer 66 to the magnets 48. As a result thereof, the attraction between the first retainer 64 and the magnets 48 is greater than the attraction between the second retainer 64 and the magnets 48. Thus, the latch arm 62 is maintained in the open position 100 absent a sufficient shock.

Figure 3A:
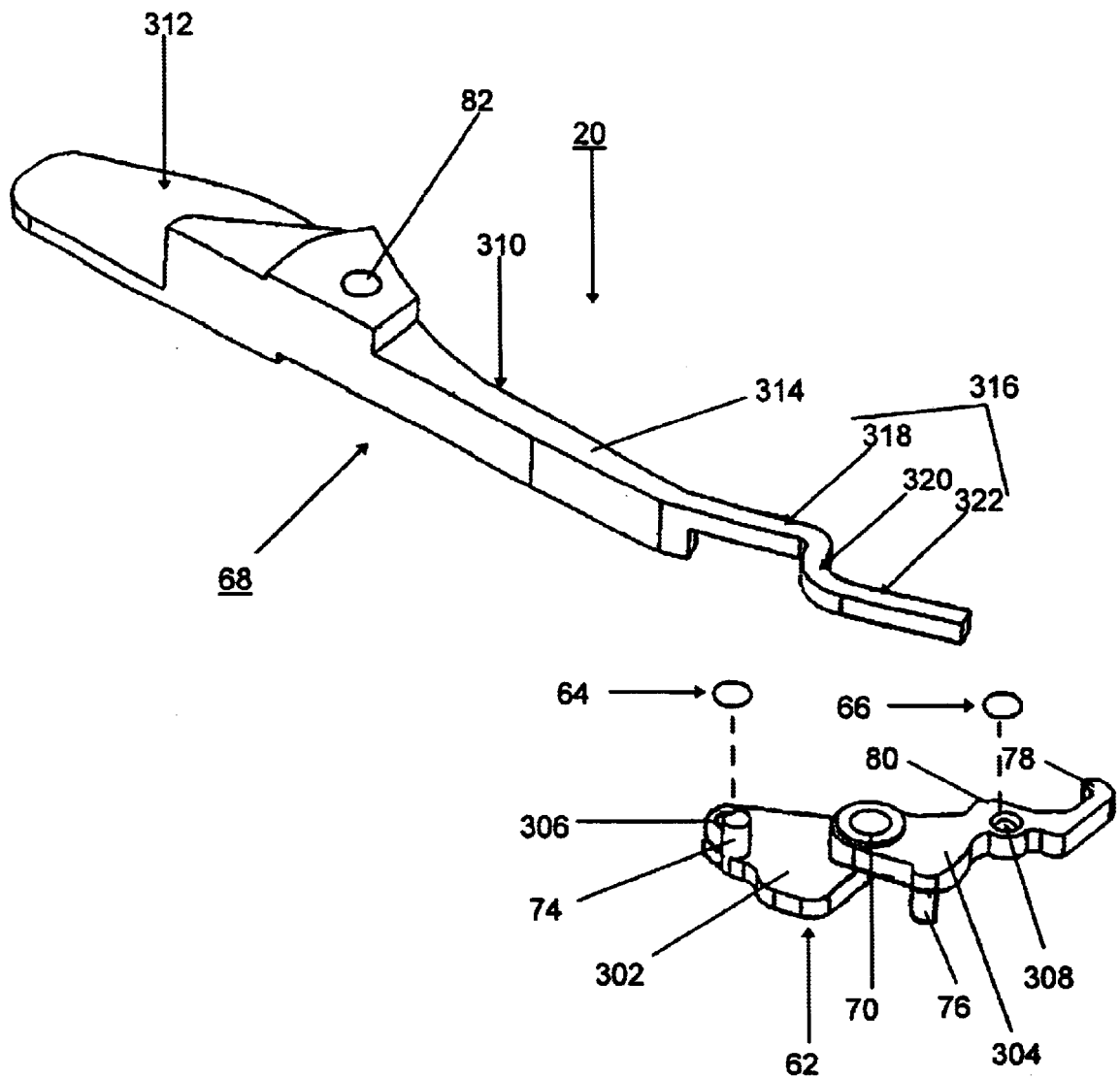
FIG. 3A is a top exploded perspective view of the latch illustrated in FIG. 1

FIG. 3A illustrates an exploded perspective view of the latch 20, including the latch arm 62, the retainers 64, 66 and the mover 68. The latch arm 62 includes a first arm section 302 that extends away from the arm hub 70 in one direction, and a second arm section 304 that extends away from the arm hub 70 in the opposite direction. The first section 302 is positioned lower than the second section 304 and sections 302, 304 are positioned in approximately parallel planes.

The first section 302 includes a first aperture 306 for receiving the first retainer 64 and the second section 304 includes a second aperture 308 for receiving the second retainer 66. In this embodiment, the apertures 306, 308 are equally spaced apart from the arm hub 70. In FIG. 3A, each of the retainers 64, 66 is generally spherical shaped.

However, the shape of the retainers 64, 66 can be varied to provide the optimal interaction with the magnets 48 (not shown in FIGS. 3A). The first retainers 64, 66 can be press fit into the apertures 306, 308. Alternately, the retainers 64, 66 can be secure to the latch arm 62 in other ways.

The first retainer 64 and the second retainer 66 can each be formed from one or more magnetically permeable materials such as iron or steel, or from any other suitable material that is attracted to one or more of the magnets 48 (not shown in FIG. 3A). Because both retainers 64, 66 are attracted to magnets 48 that already are a part of the disk drive 10, the number of parts and the cost of the latch 20 is reduced.

The force required to rotate the latch arm 62 can be adjusted by adjusting the size, composition and/or positioning of the first retainer 64 and/or the second retainer 66. For example, by increasing the size of the first retainer 64 relative to the second retainer 66, the latch arm 62 can have a greater affinity for remaining in the open position 100. As another example, positioning the second retainer 66 closer than the first retainer 64 to the arm shaft 72 results in a greater affinity for maintaining the latch arm 62 in the open position 100.

The first mover contact 74 is a cylindrical shaped beam that cantilevers upward from near a distal end of the first section 302 and the first aperture 306. The second mover contact 76 is a cylindrical shaped beam that cantilevers downward from one edge of the second section 304. The contact section 80 is formed as an opposite edge of the second section 304 near the second aperture 308. The latch stop 78 is hook shaped and is formed in a distal end of the second section 304 near the contact section 80 and the second aperture 308.

The latch arm 62 can be substantially rotationally balanced about the arm hub 70. More specifically, the mass of the first section 302, the first mover contact 74 and the first retainer 64 times the distance of the center of gravity from the arm hub 70 is approximately equal to the mass of the second section 304, the second mover contact 76 and the second retainer 66 times the distance of the center of gravity from the arm hub 70. With this design, a purely lateral force or shock to the drive housing will not cause the latch arm 62 to rotate. Stated another way, because of the substantial rotational balance, the latch arm 62 is relatively immune to rotational moments caused by linear shock events.

The latch arm 62 can be formed from relatively rigid materials such as plastics, ceramic or aluminum, as examples. Alternatively, the latch arm 62 can be formed from other suitable, preferably non-magnetic materials to inhibit magnetic interaction between the latch arm 62 and the magnets 48.

The mover 68 is generally beam shaped and includes a mover arm section 310 that extends away from the mover hub 82 in a first direction and a mover weighted section 312 that extends away from the mover hub 82 in the opposite direction. The mover arm section 310 includes a beam region 314 that extends away from the mover hub 82 and a distal tip region 316. The thickness of the beam region 314 is greater than the thickness of the distal tip region 316. Further, the distal tip region 316 includes a proximal segment 318, an intermediate curved segment 320 and a distal segment 322 that is offset from and somewhat parallel to the proximal segment 318.

The mover 68 can be substantially rotationally balanced about the mover hub 82. Stated another way, the mass of the mover arm section 310 times the distance of the center of gravity of the mover arm section 310 from the mover hub 82 is approximately equal to the mass of the mover weighted section 312 times the distance of the center of gravity of the mover weighted section from the mover hub 82. With this design, a purely lateral shock to the drive housing will not cause the mover 68 to rotate.

FIG. 3B illustrates a top perspective view of the latch 20, including the latch arm 62, the second retainer 66 and the mover 68. It should be noted that the distal tip region 316 is positioned over the first retainer (not shown in FIG. 3B) and the first arm section 302 of the latch arm 62 directly between the mover contacts 74, 76. With this design, a first side 324 of the mover 68 can engage the first mover contact 74 and a substantially opposed second side 326 of the mover 68 can alternately engage the second mover contact 76.

When a shock to the drive housing causes the mover 68 to rotate about the mover shaft 84 (not shown in FIG. 3B) in a clockwise direction, the proximal segment 318 of the mover 68 engages the first mover contact 74 and causes the latch arm 62 to rotate about the arm shaft 72 (not shown in FIG. 3B) in a counterclockwise direction towards the closed position. Alternately, when a shock to the drive housing causes the mover 68 to rotate about the mover shaft 84 in a counterclockwise direction, the distal segment 322 of the mover 68 engages the second mover contact 76 and causes the latch arm 62 to rotate in a counterclockwise direction towards the closed position.

Stated another way, the mover 68 engages the first mover contact 74 upon a sufficient force or shock in a first rotational direction to the disk drive, and moves the latch arm 62 to the closed position. Further, the mover 68 engages the second mover contact 76 upon a sufficient force or shock in an opposite, second rotational direction to the disk drive, and moves the latch arm 62 to the closed position. With this design, the same mover 68 moves the latch arm 62 to the closed position if the shock is in the first rotational direction or if the shock is in the second rotational direction.

FIG. 3C illustrates a bottom perspective view of the latch 20, including the latch arm 62, the retainers 64, 66 and the mover 68.

Operation

Figure 4:
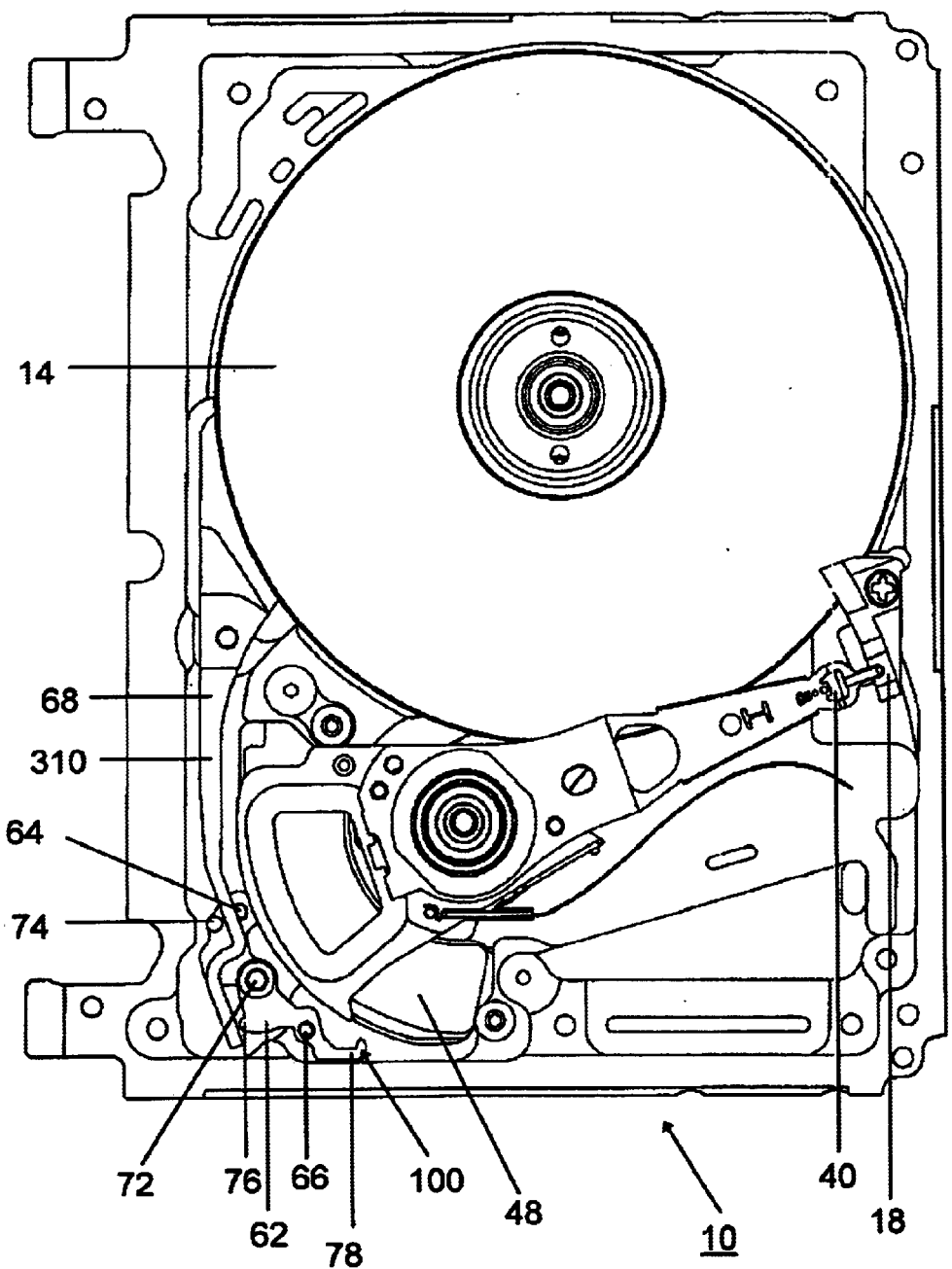
FIG. 4 is a top plan view of the disk drive illustrated in FIG. 1 with the latch in an open position.

FIG. 4 illustrates a top plan view of the disk drive 10 with the latch arm 62 in the open position 100 and the slider 40 in the landing zone 18. In this position, the latch stop 78 does not engage the head stack assembly 16 and the head stack assembly 16 is free to move the slider 40 from the landing zone 18 to the storage disk 14. In the open position 100, the mover arm section 310 of the mover 68 is positioned between the mover contacts 74, 76 and the first retainer 64 is closer than the second retainer 66 to the magnets 48 (only one magnet is illustrated in FIG. 4). In this position, the attraction force created by the interaction between the first retainer 64 and the magnets 48 is greater than the attraction force created by the interaction between the second retainer 66 and the magnets 48.

It should also be noted that because the attraction force created by the interaction between the second retainer 66 and the magnets 48 counteracts the attraction force created by the interaction between the first retainer 64 and the magnets 48, the bias force that holds the latch arm 62 in the open position 100 is relatively low. Thus, a relatively small rotational shock will cause the mover 68 to rotate the latch arm 62 to protect against relatively small shocks. However, as discussed above, the force required to rotate the latch arm 62 can be adjusted by adjusting the size, composition and/or positioning of the first retainer 64 and/or the second retainer 66.

Figure 5:
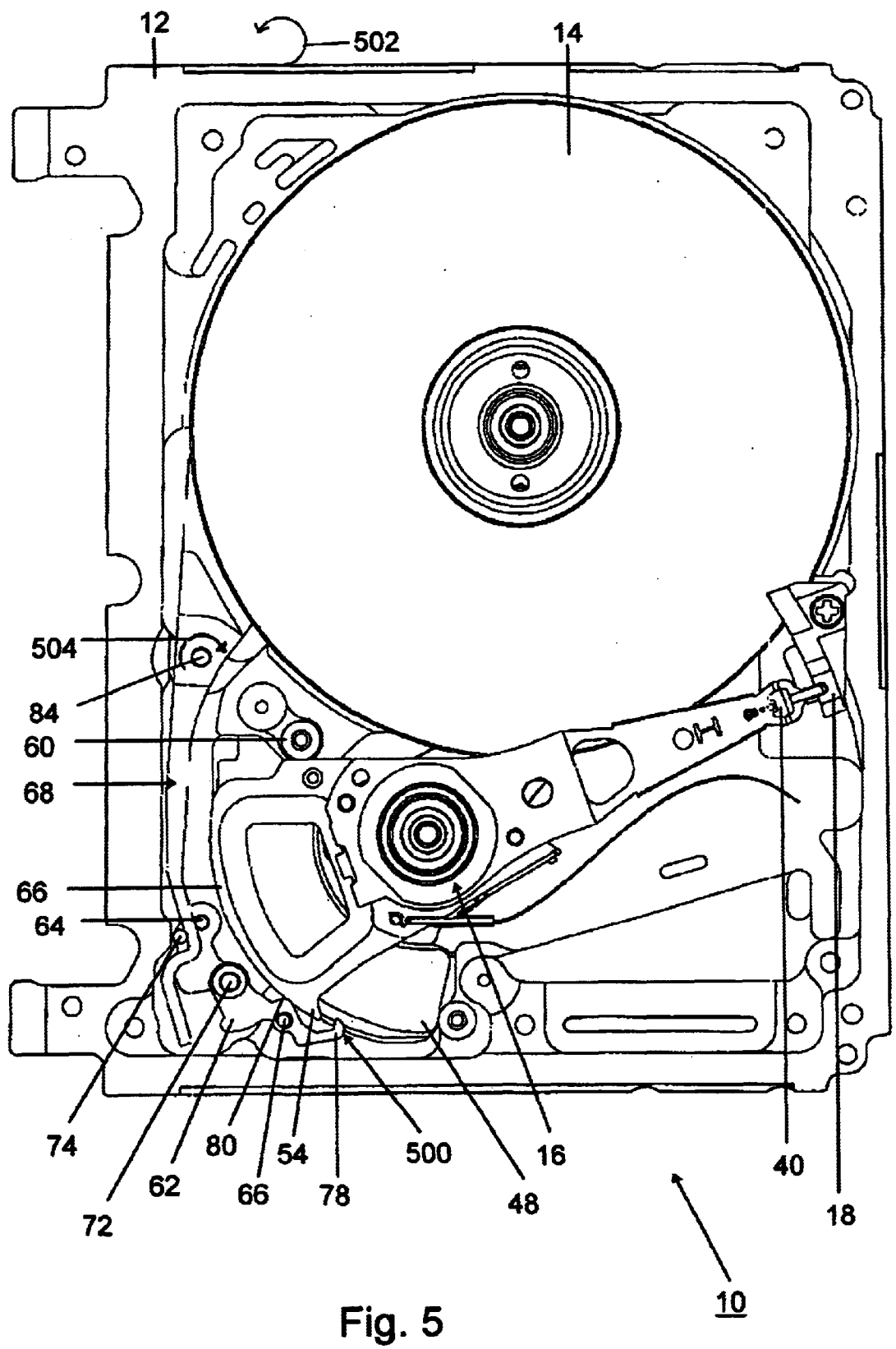
FIG. 5 is a top plan view of the disk drive illustrated in FIG. 1 with a over engaging a first mover contact and urging the latch into a closed position.

FIG. 5 illustrates a top plan view of the disk drive 10 with the latch arm 62 in the closed position 500 and the slider 40 in the landing zone 18. FIG. 5 illustrates that a sufficient shock to the disk drive 10 caused a counterclockwise rotational force 502 (illustrated as an arrow) to be imparted on the drive housing 12. This resulted in a clockwise moment 504 (illustrated as an arrow) to be imparted upon the mover 68 and rotation of the mover 68 in the clockwise direction about the mover shaft 84 relative to the drive housing 12. As a result thereof, the mover 68 engaged the first mover contact 74 and imparted a force on the latch arm 62 that cooperated with the attraction force between the second retainer 66 and the magnets 48 to move the latch arm 62 counterclockwise about the arm shaft 72 from the open position 100 to the closed position 500. It should be noted that in order to move the latch arm 62 from the open position 100 to the closed position 500, the mover 68 and the second retainer 66 must overcome the attraction force between the first retainer 64 and magnets 48 that maintains the latch arm 62 in the open position 100.

In the closed position 500, the latch stop 78 is positioned to engage the actuator catch 54 of the head stack assembly 16 and inhibit the head stack assembly 16 from moving the slider 40 from the landing zone 18 to the storage disk 14. More specifically, in the closed position 500, movement of head stack assembly 16 away from the outer diameter stop 60 is limited to a travel distance of generally less than approximately 0.5 millimeters. However, the travel distance can vary depending upon the design requirements of the disk drive 10.

Further, in the closed position 500, the second retainer 66 is closer than the first retainer 64 to the magnets 48 (only one magnet is illustrated in FIG. 5). In this position, the attraction force created by the interaction between the second retainer 66 and the magnets 48 is greater than the attraction force created by the interaction between the first retainer 64 and the magnets 48. Thus, the latch arm 62 will remain in the closed position 500.

During startup of the disk drive 10, the head stack assembly 16 can be rotated in the clockwise direction against the resilient outer diameter stop 60 using the actuator motor 34. This causes the conductor housing 46 of the head stack assembly 16 to engage the contact section 80 of the latch arm 62 and move the latch arm 62 in the clockwise direction about the arm shaft 72 from the closed position 500 to the open position 100. Because the actuator motor 34 is capable of generating a force much larger than that of the head stack assembly 16 after bouncing off latch stop 78, second retainer 66 can be designed to provide sufficient force such that the latch 20 will remain closed until startup of the disk drive 10. With this design, a separate motor is not necessary to move the latch arm 62 from the closed position 500.

While the latch arm 62 is in the closed position 500, the contact section 80 can be in contact with, or be in close proximity to, the conductor housing 46 of the head stack assembly 16. In this manner, the head stack assembly 16 need only rotate a relatively short distance toward the outer diameter stop 60 in order to urge the contact section 80 in such a way that rotates the latch arm 62 to the open position 100.

Figure 6:
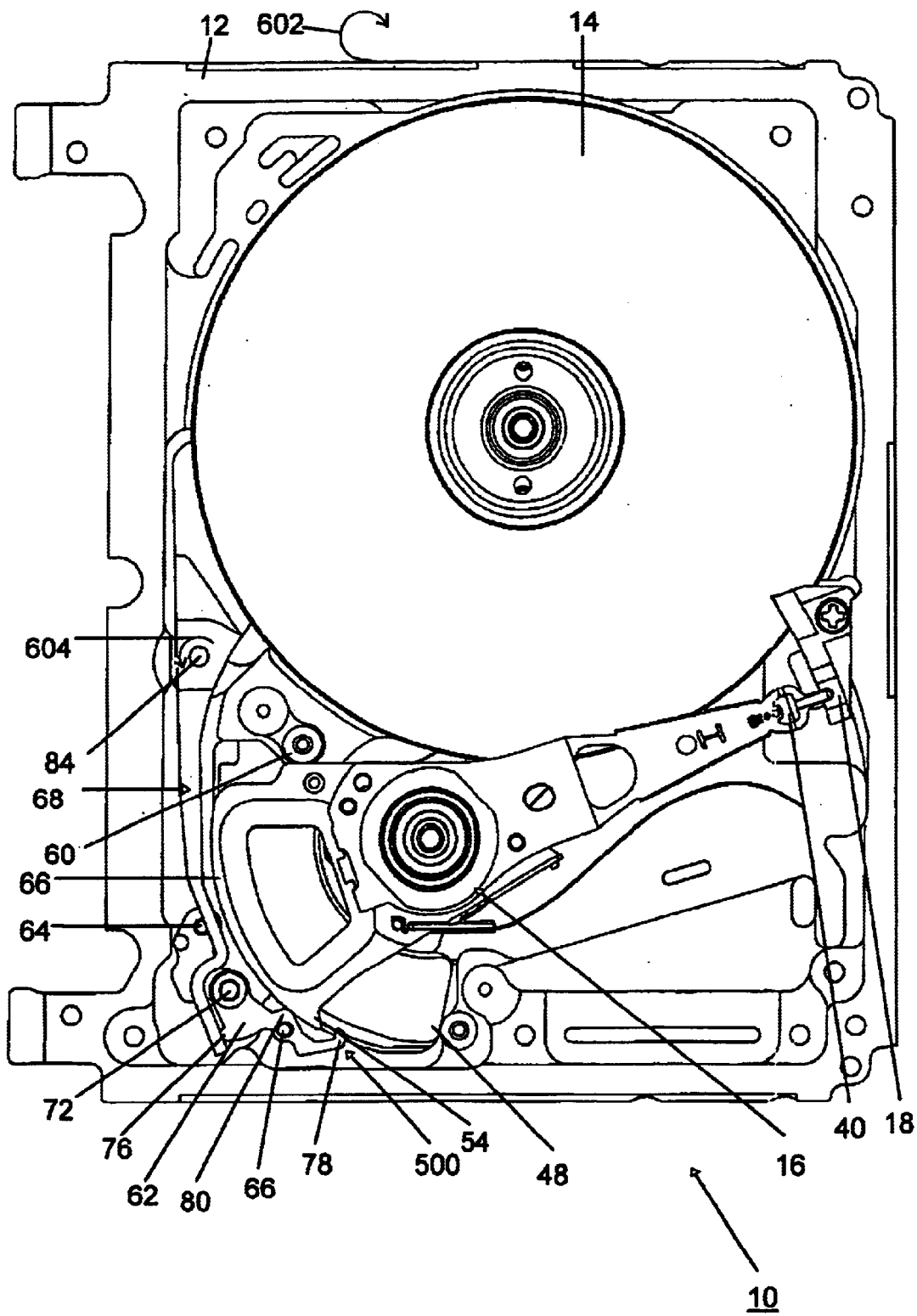
FIG. 6 is a top plan view of the disk drive illustrated in FIG. 1 with the mover engaging a second mover contact and urging the latch into the closed position.

FIG. 6 illustrates a top plan view of the disk drive 10 with the latch arm 62 in the closed position 500 and the slider 40 in the landing zone 18. More specifically, FIG. 6 illustrates that a sufficient shock to the disk drive 10 causes a clockwise rotational force 602 (illustrated as an arrow) to be imparted on the drive housing 12. This results in a counterclockwise moment 604 (illustrated as an arrow) to be imparted upon the mover 68 and rotation of the mover 68 in the counterclockwise direction about the mover shaft 84 relative to the drive housing 12. As a result thereof, the mover 68 engaged the second mover contact 76 and imparted a force on the latch arm 62 that cooperated with the attraction force between the second retainer 66 and the magnets 48 to move the latch arm 62 counterclockwise about the arm shaft 72 from the open position 100 to the closed position 500.

In the closed position 500, the latch stop 78 is positioned to engage the actuator catch 54 of the head stack assembly 16 and inhibit the head stack assembly 16 from moving the slider 40 from the landing zone 18 to the storage disk 14. During startup of the disk drive 10, the head stack assembly 16 can be rotated in the clockwise direction to move the latch arm 62 about the arm shaft 72 from the closed position 500 to the open position 100.

It should be noted that absent a force that includes a rotational component that generates a moment on the mover 68 about the mover shaft 84, rotation of the mover 68 should be minimal or nonexistent. Therefore, if the no significant moment is generated on the mover 68, likewise no significant moment will be generated on the head stack assembly 16. Only when a rotational component is included in the force or shock to the disk drive 10 will activation of the latch 20 be initiated. Thus, the first retainer 64 will maintain the latch arm 62 in the open position 100.

While the particular latch 20 and disk drive 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A disk drive, comprising:
    a head stack assembly; and
    a latch that includes a latch arm, a first retainer secured to the latch arm, and a second retainer secured to the latch arm, the latch arm being movable between a closed position that inhibits movement of the head stack assembly and an open position that does not inhibit movement of the head stack assembly, the first retainer selectively retaining the latch arm in the open position, and the second retainer selectively retaining the latch arm in the closed position, the second retainer being spaced apart from the first retainer.

2. The disk drive of claim 1 further comprising a magnet component and wherein both of the retainers interact with the magnet component.

3. The disk drive of claim 1 further comprising a stop that inhibits movement of the head stack assembly, wherein, the latch arm retains the head stack assembly near the stop when the latch arm is in the closed position.

4. The disk drive of claim 1 further including a drive housing, wherein the latch further includes a mover that contacts the latch arm upon sufficient shock to the drive housing, and causes the latch arm to move from the open position to the closed position.

5. The disk drive of claim 4 wherein the latch arm includes a first mover contact and a second mover contact and wherein the mover engages the first mover contact upon sufficient shock to the drive housing in a first direction and causes the latch arm to move from the open position to the closed position and wherein the mover engages the second mover contact upon sufficient shock to the drive housing in an opposite, second direction and causes the latch arm to move from the open position to the closed position.

6. The disk drive of claim 5 wherein the mover is positioned directly between the mover contacts and the mover includes a first side that engages the first mover contact and a second side that engages the second mover contact.

7. The disk drive of claim 5 wherein the latch arm further includes an arm hub that rotatably supports the latch arm and wherein the first mover contact is positioned on one side of the arm hub and the second mover contact is positioned on the other side of the arm hub.

8. The disk drive of claim 7 wherein the first retainer is positioned on one side of the arm hub and the second retainer is positioned on the other side of the arm hub.

9. The disk drive of claim 1 wherein the latch arm further includes an arm hub that rotatably supports the latch arm and the latch arm is substantially rotatably balanced about the arm hub.

10. The disk drive of claim 1 further comprising an outer diameter stop and an inner diameter stop, wherein the head stack assembly has a first side that engages the outer diameter stop and a second side that engages the inner diameter stop, and wherein the latch arm engages the second side of the head stack assembly when the head stack assembly is near the outer diameter stop to inhibit movement of the head stack assembly when the latch arm is in the closed position.

11. The disk drive of claim 1 wherein the head stack assembly contacts the latch arm to move the latch arm from the closed position to the open position.

12. The disk drive of claim 11 wherein the head stack assembly includes an actuator motor that moves the head stack assembly so that the head stack assembly contacts the latch arm and causes the latch arm to move from the closed position to the open position.

13. The disk drive of claim 1 wherein rotation of head stack assembly against an outer diameter stop causes the head stack assembly to contact the latch arm and move the latch arm from the closed position to the open position.

14. The disk drive of claim 1 wherein the head stack assembly includes an actuator motor that generates a magnetic field and moves the head stack assembly, and the first retainer interacts with the magnetic field to selectively retain the latch arm in the open position.

15. The disk drive of claim 14 wherein the second retainer interacts with the magnetic field to selectively retain the latch arm in the closed position.

16. The disk drive of claim 15 wherein the actuator motor includes a magnet component, wherein in the open position, the first retainer is closer to the magnet component than the second retainer, and wherein in the closed position, the second retainer is closer to the magnet component than the first retainer.

17. The disk drive of claim 1 wherein the head stack assembly includes an actuator motor that generates a magnetic field and moves the head stack assembly, and the second retainer interacts with the magnetic field to selectively retain the latch arm in the closed position.

18. The disk drive of claim 1 wherein each retainer includes a magnetically permeable member that is secured to the latch arm.

19. A disk drive, comprising:
a drive housing;
a head stack assembly coupled to the drive housing; and
a bi-stable latch that includes a latch arm and a mover, the latch arm being movable between a closed position that inhibits movement of the head stack assembly and an open position that allows for movement of the head stack assembly, the latch arm including a first mover contact and a second mover contact, the mover being adapted to alternately engage the mover contacts and cause the latch arm to move from the open position to the closed position upon a sufficient shock to the drive housing.

20. The disk drive of claim 19 wherein the mover engages the first mover contact upon sufficient shock to the drive housing in a first direction and causes the latch arm to move from the open position to the closed position and wherein the mover engages the second mover contact upon sufficient shock to the drive housing in an opposite, second direction and causes the latch arm to move from the open position to the closed position.

21. The disk drive of claim 19 wherein the mover is positioned directly between the mover contacts, the mover including a first side that engages the first mover contact and a substantially opposed, second side that engages the second mover contact.

22. The latch of claim 19 further comprising a first retainer that selectively retains the latch arm in the open position, and a second retainer that selectively retains the latch arm in the closed position, the second retainer being spaced apart from the first retainer.

23. The latch of claim 22, wherein both retainers are secured to the latch arm.

24. The disk drive of claim 22 further comprising a magnet component and wherein both of the retainers interact with the magnet component.

25. The disk drive of claim 22 wherein the latch arm further includes an arm hub that rotatably supports the latch arm and wherein the first retainer is positioned on one side of the arm hub and the second retainer is positioned on the other side of the arm hub.

26. The disk drive of claim 25 wherein the first mover contact is positioned on one side of the arm hub and the second mover contact is positioned on the other side of the arm hub.

27. The disk drive of claim 22 wherein the head stack assembly includes an actuator motor that generates a magnetic field and moves the head stack assembly, and the first retainer interacts with the magnetic field to selectively retain the latch arm in the open position.

28. The disk drive of claim 27 wherein the second retainer interacts with the magnetic field to selectively retain the latch arm in the closed position.

29. The disk drive of claim 28 wherein the actuator motor includes a magnet component, wherein in the open position, the first retainer is closer to the magnet component than the second retainer, and wherein in the closed position, the second retainer is closer to the magnet component than the first retainer.

30. The disk drive of claim 22 wherein the head stack assembly includes an actuator motor that generates a magnetic field and moves the head stack assembly, and the second retainer interacts with the magnetic field to selectively retain the latch arm in the closed position.

31. The disk drive of claim 22 wherein each retainer includes a magnetically permeable member that is secured to the latch arm.

32. The disk drive of claim 19 wherein the latch arm further includes an arm hub that rotatably supports the latch arm and wherein the first mover contact is positioned on one side of the arm hub and the second mover contact is positioned on the other side of the arm hub.

33. The disk drive of claim 19 wherein the head stack assembly contacts the latch arm to move the latch arm from the closed position to the open position.

34. The disk drive of claim 19 wherein rotation of head stack assembly against an outer diameter stop causes the head stack assembly to contact the latch arm and move the latch arm from the closed position to the open position.

35. A disk drive, comprising:
a drive housing;
a storage disk coupled to the drive housing;
a head stack assembly coupled to the drive housing;
an outer diameter stop that inhibits movement of the head stack assembly; and
a latch that includes a latch arm, a first retainer secured to the latch arm, a second retainer secured to the latch arm, and a mover, the latch arm being movable between a closed position that inhibits movement of the head stack assembly away from the outer diameter stop and an open position that allows for movement of the head stack assembly, the first retainer selectively retaining the latch arm in the open position, and the second retainer selectively retaining the latch arm in the closed position, the second retainer being spaced apart from the first retainer, the latch arm including a first mover contact and a second mover contact, wherein the mover engages the first mover contact upon sufficient shock to the drive housing in a first direction and causes the latch arm to move from the open position to the closed position and wherein the mover engages the second mover contact upon sufficient shock to the drive housing in an opposite, second direction and causes the latch arm to move from the open position to the closed position.

36. The disk drive of claim 35 wherein the head stack assembly includes a magnet component and wherein both of the retainers are attracted to the magnet component.

37. The disk drive of claim 35 wherein the mover is positioned directly between the mover contacts and the mover includes a first side that engages the first mover contact and a second side that engages the second mover contact.

38. The disk drive of claim 35 wherein the latch arm further includes an arm hub that rotatably supports the latch arm and wherein the first mover contact is positioned on one side of the arm hub and the second mover contact is positioned on the other side of the arm hub.

39. The disk drive of claim 38 wherein the first retainer is positioned on one side of the arm hub and the second retainer is positioned on the other side of the arm hub.

40. The disk drive of claim 35 wherein the latch arm further includes an arm hub that rotatably supports the latch arm and the latch arm is substantially rotatably balanced relative to the arm hub.

41. The disk drive of claim 35 wherein the head stack assembly contacts the latch arm to move the latch arm from the closed position to the open position.

42. The disk drive of claim 35 wherein rotation of head stack assembly against the outer diameter stop causes the head stack assembly to contact the latch arm and move the latch arm from the closed position to the open position.

43. The disk drive of claim 35 wherein the head stack assembly includes an actuator motor that generates a magnetic field and moves the head stack assembly, and the first retainer interacts with the magnetic field to selectively retain the latch arm in the open position.

44. The disk drive of claim 43 wherein the second retainer interacts with the magnetic field to selectively retain the latch arm in the closed position.

45. The disk drive of claim 44 wherein the actuator motor includes a magnet component, wherein in the open position, the first retainer is closer to the magnet component than the second retainer, and wherein in the closed position, the second retainer is closer to the magnet component than the first retainer.

46. The disk drive of claim 35 wherein the head stack assembly includes an actuator motor that generates a magnetic field and moves the head stack assembly, and the second retainer interacts with the magnetic field to selectively retain the latch arm in the closed position.

47. The disk drive of claim 35 wherein each retainer includes a magnetically permeable member that is secured to the latch arm.

48. A method for selectively retaining a head stack assembly near a stop of a disk drive, the head stack assembly being movable relative to the stop with an actuator motor that generates a magnetic field, the method comprising the steps of:
providing a latch arm that is movable between an open position that allows for movement of the head stack assembly and a closed position that inhibits movement of the head stack assembly;
urging the latch arm to the open position with a first retainer that is attracted to the magnetic field; and
urging the latch arm to the closed position with a second retainer that is attracted to the magnetic field.

49. The method of claim 48 further comprising the step of providing a mover that contacts the latch arm upon sufficient shock to the disk drive, wherein the mover engages the latch arm upon sufficient shock to the disk drive in a first direction and causes the latch arm to move from the open position to the closed position and wherein the mover engages the latch arm upon sufficient shock to the disk drive in an opposite, second direction and causes the latch arm to move from the open position to the closed position.

50. The method of claim 48 further comprising the step of moving the latch arm from the closed position to the open position with the head stack assembly.

51. The method of claim 50 wherein the step of moving the latch arm includes the step of rotating the head stack assembly against the stop.

52. A method for selectively retaining a head stack assembly near a stop of a disk drive, the head stack assembly being movable relative to the stop with an actuator motor that generates a magnetic field, the method comprising the steps of:
providing a latch arm that is movable between an open position that allows for movement of the head stack assembly and a closed position that inhibits movement of the head stack assembly;
urging the latch arm to the open position with a first retainer;
urging the latch arm to the closed position with a second retainer; and
providing a mover that contacts the latch arm upon sufficient shock to the disk drive, wherein the mover engages the latch arm upon sufficient shock to the disk drive in a first direction and causes the latch arm to move from the open position to the closed position and wherein the mover engages the latch arm upon sufficient shock to the disk drive in an opposite, second direction and causes the latch arm to move from the open position to the closed position.

53. The method of claim 52 further comprising the step of moving the latch arm from the closed position to the open position with the head stack assembly.

* * * * *